United States Patent

Staser et al.

[11] Patent Number: 5,855,096
[45] Date of Patent: Jan. 5, 1999

[54] ROD ORIENTING RECEPTACLES FOR DOOR MODULE INSTALLATION

[75] Inventors: Brian Hale Staser, Troy; Daniel Henry Forrest, Macomb Township, both of Mich.

[73] Assignee: General Motors Corporation, Detroit, Mich.

[21] Appl. No.: 766,649

[22] Filed: Dec. 13, 1996

[51] Int. Cl.⁶ .................................................. E06B 3/00
[52] U.S. Cl. .............................................. 49/503; 49/502
[58] Field of Search .................. 49/503, 502; 296/146.1, 296/146.5

[56] References Cited

U.S. PATENT DOCUMENTS

| 5,251,403 | 10/1993 | Compeau et al. | 49/502 |
| 5,492,379 | 2/1996 | Staser et al. | 49/503 X |
| 5,505,024 | 4/1996 | DeRees et al. | 49/503 |
| 5,535,553 | 7/1996 | Staser et al. | 49/502 |

*Primary Examiner*—Daniel P. Stodola
*Assistant Examiner*—Gregory J. Strimbu
*Attorney, Agent, or Firm*—Charles E. Leahy

[57] ABSTRACT

A vehicle door module includes a door latch mounted on the module and has first and second bent wire rods preassembled on the door latch. The portion of the module to which the door latch is mounted is of molded plastic construction and has an integrally molded first receptacle in which the first bent wire rod is releasably snap-retained. A plastic mounting clip is attached to the door latch and has a molded second receptacle in which the second bent wire is releasably snap-retained. The first and second receptacles retain the first and second bent wire rods, respectively, to orient the bent wire rods to facilitate installation of the module into a vehicle door. The first and second receptacles permit release of the first and second bent wire rod therefrom to permit connection of the bent wire rods respectively to an outside door handle and an outside lock cyinder.

2 Claims, 2 Drawing Sheets

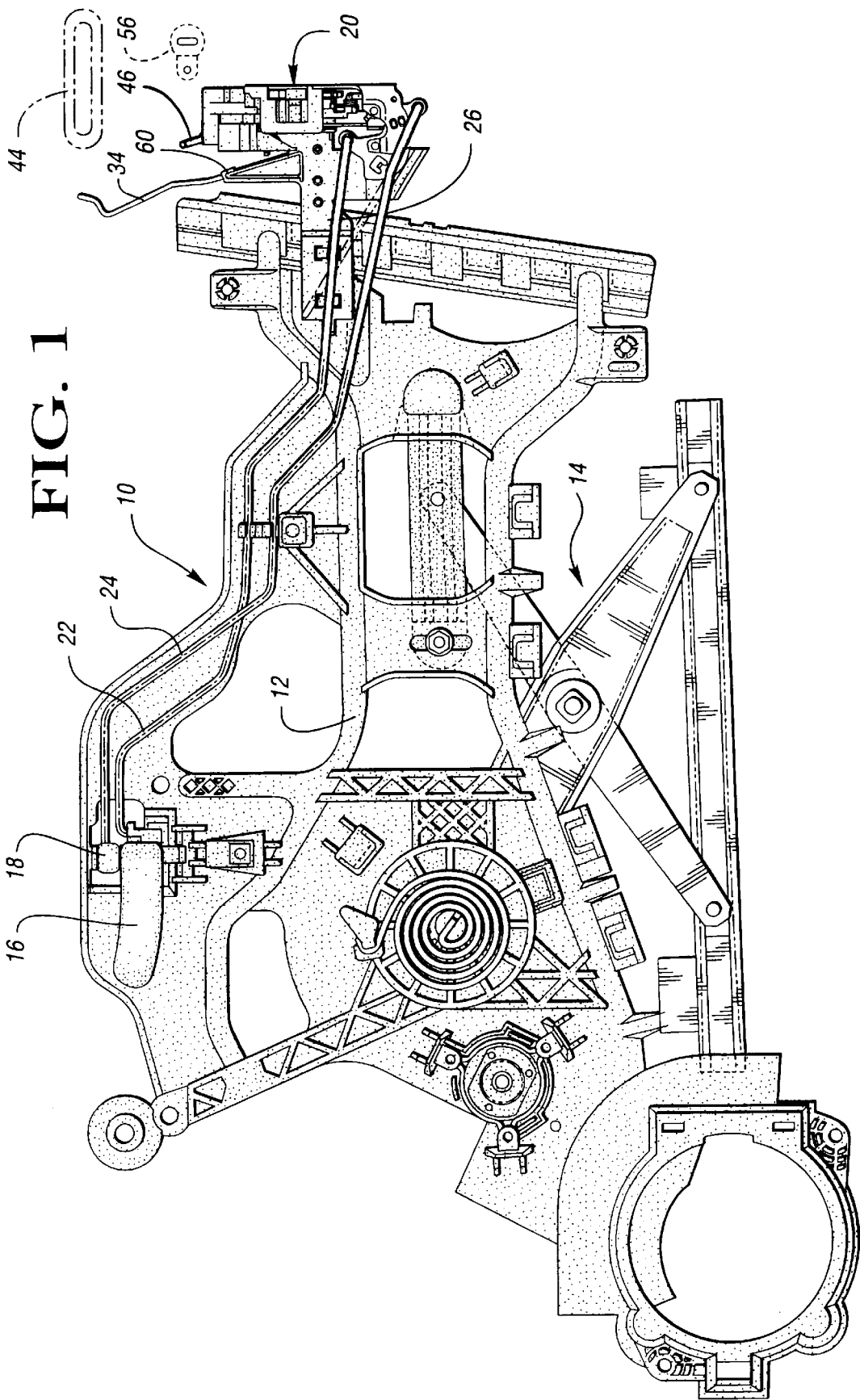

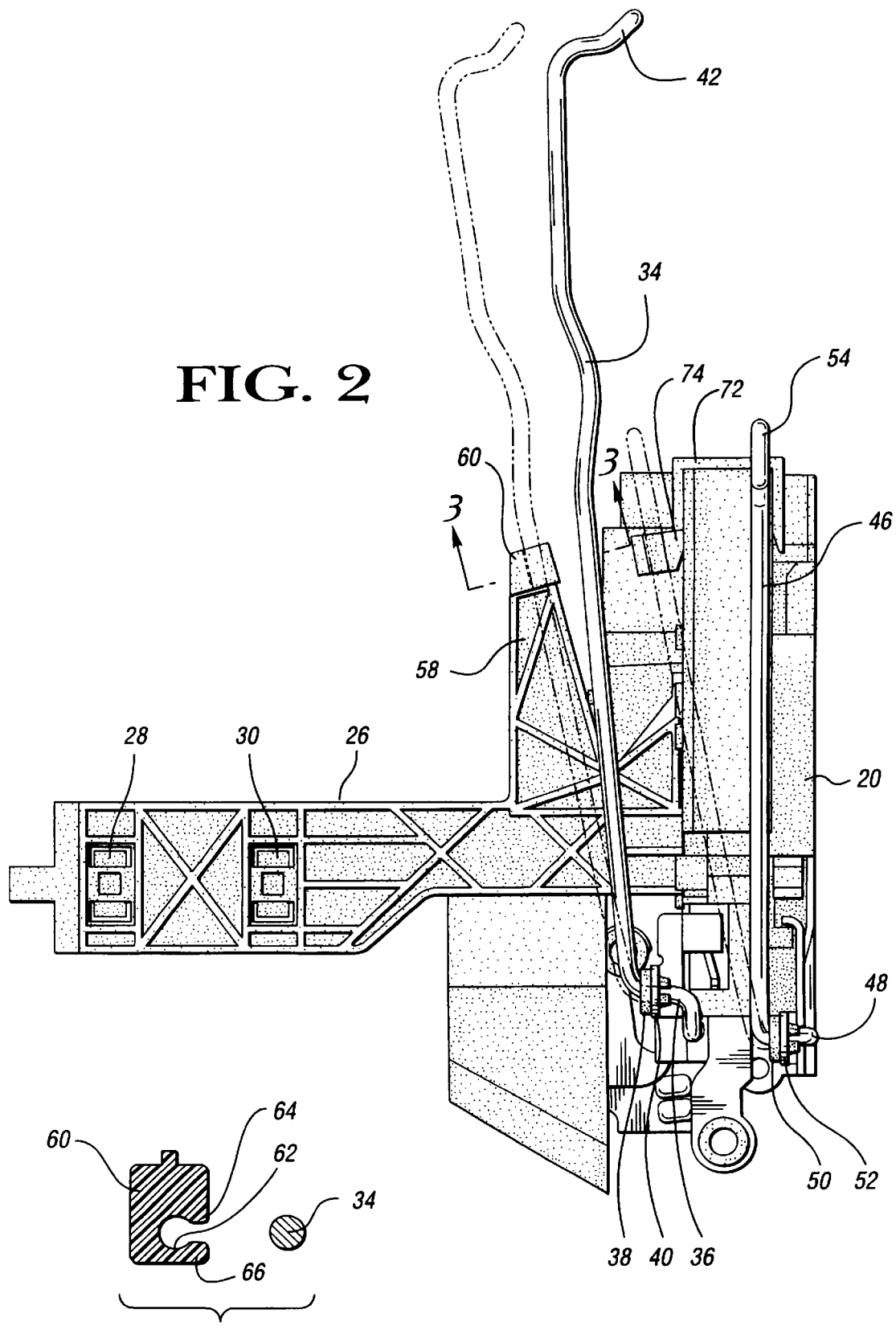

ROD ORIENTING RECEPTACLES FOR DOOR MODULE INSTALLATION

TECHNICAL FIELD

This invention relates to a vehicle door module which carries a door latch and has integrally molded receptacles for snap-retaining bent wire door latch operating rods pivotally connected to the door latch.

BACKGROUND OF THE INVENTION

It is well known in vehicle doors to provide a door module in which a frame of metal or molded plastic carries a plurality of components such as the window regulator and door latch.

For example, U.S. Pat. No. 5,535,553, teaches such a door module in which the frame is of molded plastic construction and includes a molded plastic frame portion to which the door latch is attached. An advantage of this modular construction is that the inside door handle and lock operating buttons may be assembled onto the module and connected to the door latch by bent wire rods which are also pre-assembled and tested as part of the door module. After the module is mounted inside the vehicle door, additional bent wire rods are installed onto the latch and connected to the outside door handle and outside lock cylinder.

A disadvantage of the aforedescribed module construction resides in the difficulty for the assembly person to reach inside the door to make the connection between the bent wire rods and the door latch.

SUMMARY OF THE INVENTION

According to the invention, a vehicle door module of the type having a door latch mounted on the module also has the bent wire rods pre-assembled to the door latch and the portion of the module to which the door latch is mounted is of molded plastic construction and has an integrally molded receptacle in which the bent wire rod is snap retained to orient the bent wire rod to facilitate installation into the door. The receptacle permits release of the bent wire rod therefrom to permit connection of the bent wire rod to the outside door handle and/or outside lock cylinder.

BRIEF DESCRIPTION OF THE DRAWINGS

These and other objects, features and advantages of the invention will become apparent upon consideration of the Description of the Preferred Embodiment and the appended drawings in which:

FIG. 1 is a side elevation view of the inside of a right-hand vehicle door module according to the invention;

FIG. 2 is an enlarged fragmentary view showing the plastic portion of the inside view of a left hand door module to which the door latch is mounted, and having receptacles for retaining the bent wire rods; and FIG. 3 is a section view taken in the direction of arrows 3—3 of FIG. 2.

DESCRIPTION OF THE PREFERRED EMBODIMENT

Referring to FIG. 1, it is seen that a vehicle door module, generally indicated at 10, includes a molded plastic frame 12 upon which various door components are mounted, including a window regulator assembly generally indicated at 14, an inside door handle 16, an inside lock button 18 and a door latch assembly 20. The inside handle 16 is connected to the door latch 20 by a bent wire operating rod 22, the inside lock button 18 is operably connected to the door latch 20 by a bent wire operating rod 24.

As seen in FIGS. 1 and 2, the door latch 20 is suitably attached to a molded plastic door latch mounting portion 26 of the plastic frame 12. As best seen in FIG. 2, a pair of T-shaped mounting blocks 28 and 30, project off of the backside of the plastic mounting portion 26 and are slidably received within keyhole shaped slots of the frame 12 to permit limited longitudinal movement of the door latch assembly 20 relative the module 10 to facilitate the loading of the door module into the vehicle door.

As seen in the drawings, the door latch 20 includes a bent wire latch operating rod 34 having a lower end 36 which is bent to fit within a plastic bushing 38 carried by a unlatching lever 40 of the door latch 20. The bent wire latch operating rod 34 has an upper end 42 which will subsequently be suitably attached to an outside door handle 44, shown in phantom lines in FIG. 1. The door latch 20 also includes a bent wire lock operating rod 46 having a lower end 48 which is received within a bushing 50 carried on the locking lever 52 of the door latch 20. The lock operating rod 46 has an upper end 54 for subsequent connection with a door mounted key cylinder 56, shown in phantom in FIG. 1.

It will be understood that the pivotal connection of the lower ends of the latch operating rod 34 and lock operating rod 46 will permit the rods 34 and 46 to pivot so that the rods are free to pivot and may become disoriented and assume an undesired position which would complicate the handling and installation of the door module 10.

According to the present invention, as best shown in FIGS. 2 and 3, the mounting portion 26 of the module includes an upstanding arm 58 which is integrally molded thereon and includes an integrally molded U-shaped receptacle 60 having a opening 62 defined between a pair of snap lugs 64 and 66. It will be understood and appreciated that the latch operating rod 34 may be snap fit into the opening 62 between the lugs 64 and 66 to thereby retain and orient the rod 34 at the predetermined and convenient orientation shown in FIG. 1. In addition, a plastic mounting clip 72 snaps onto the door latch 20 and has an integral receptacle 74 molded thereon for receiving and snap retaining the lock operating rod 46 to orient the rod 46 at the desired orientation of FIG. 1.

Upon insertion of the door module into the vehicle door and attachment thereto, it will be appreciated that the rods 34 and 46 are reliably and repeatedly positioned at the orientation shown in FIG. 1 for easy access by the assembly operator. In order to attach the latch operating rod 34 to the outside handle 44, the operator simply grips the latch operating rod 34 and unsnaps the rod 34 from the opening 62 of the receptacle 60 as permitted by slight flexure of the receptacle lug 64 and 66. Likewise, the lock operating rod 46 may be unsnapped from its receptacle 74 and pivoted from the stored position of FIG. 1 to the installation of FIG. 2.

Thus, it is seen that the invention provides a new and improved plastic module frame for a vehicle door having receptacles for respectively snap retaining and orienting the outside handle rod and outside key cylinder rod.

We claim:

1. In a vehicle door having an outside and an outside handle mounted on the outside, a vehicle door module having a door latch mounted on the module for subsequent installation of the module and the door latch into the vehicle door, the improvement comprising:

at least one bent wire rod having an upper end and a lower end, said lower end pivotally connected to the door latch such that the bent wire rod is pivotable relative to the module between an oriented position and a connecting position, and a molded plastic receptacle attached to molded plastic portion of the module, the door latch being mounted to the molded plastic portion and and the bent wire rod being releasably snap-retained in the receptacle when the bent wire rod is in said oriented position, said receptacle retaining the bent wire rod in the oriented position during the installation of the module and the door latch into the vehicle door and permitting release of the bent wire rod therefrom to permit pivoting of the bent wire rod relative to the module from the oriented position to the connecting position to facilitate a connection of the bent wire rod to the outside handle.

2. In a vehicle door having an outside and a key cylinder mounted on the outside, a vehicle door module having a door latch mounted on the module for subsequent installation of the module and the door latch into the vehicle door, the improvement comprising:

at least one bent wire rod having an upper end and a lower end, said lower end pivotally connected to the door latch such that the bent wire rod is pivotable relative to the module between an oriented position and a connecting position, and a molded plastic receptacle carried by the module, the bent wire rod being releasably snap-retained in the receptacle when the bent wire rod is in said oriented position, said receptacle retaining the bent wire rod in the oriented position during the installation of the module and the door latch into the vehicle door and permitting release of the bent wire rod therefrom to permit pivoting of the bent wire rod relative to the module from the oriented position to the connecting position to facilitate a connection of the bent wire rod to the key cylinder.

* * * * *